T. E. MURRAY
ELECTRICAL WELDING APPARATUS FOR PIPE COUPLINGS.
APPLICATION FILED FEB. 16, 1918.

1,267,258.

Patented May 21, 1918.

2 SHEETS—SHEET 1.

INVENTOR
Thomas E. Murray
BY
his ATTORNEY

INVENTOR
Thomas E. Murray
BY Park Benjamin
ATTORNEY

UNITED STATES PATENT OFFICE.

THOMAS E. MURRAY, OF NEW YORK, N. Y.

ELECTRICAL WELDING APPARATUS FOR PIPE-COUPLINGS.

1,267,258.  Specification of Letters Patent.  Patented May 21, 1918.

Application filed February 16, 1918. Serial No. 217,494.

*To all whom it may concern:*

Be it known that I, THOMAS E. MURRAY, a citizen of the United States, residing at New York, in the county of New York and State of New York, have invented a certain new and useful Improvement in Electrical Welding Apparatus for Pipe-Couplings; of which the following is a specification.

The invention is an apparatus for electrically welding reinforcing rings to pipe couplings, and consists in the construction more particularly hereinafter described.

In the accompanying drawings—

Figure 1:
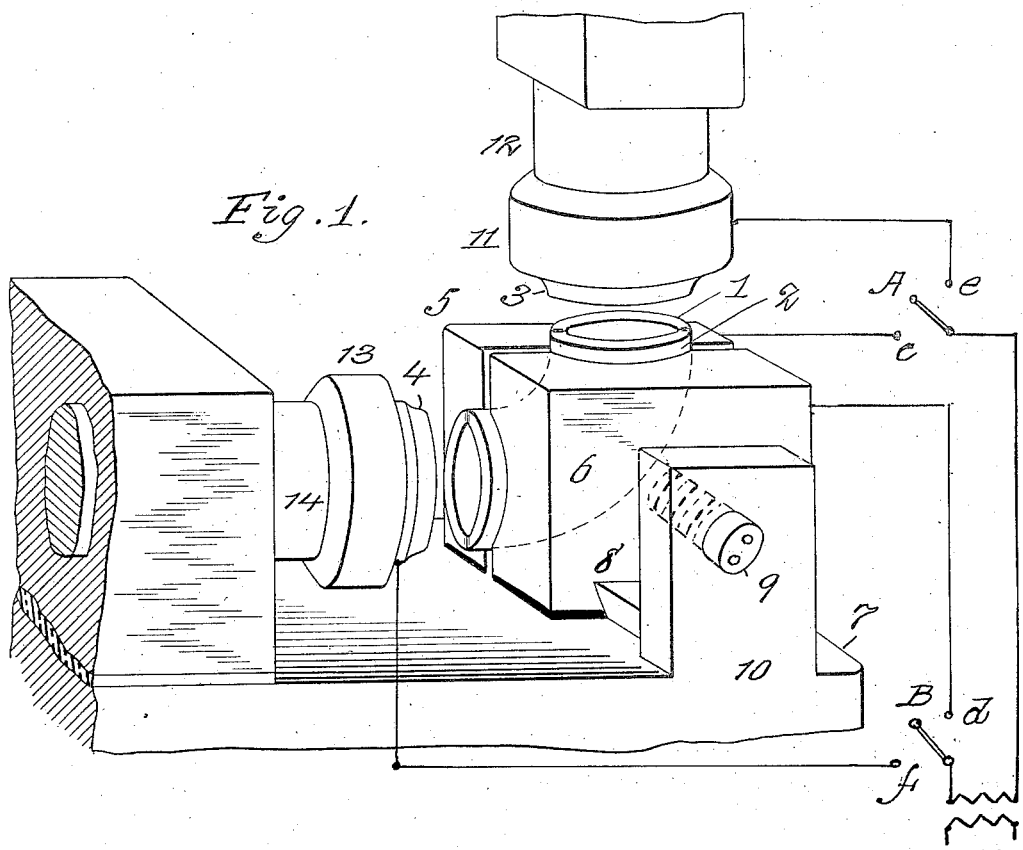
Figure 2:
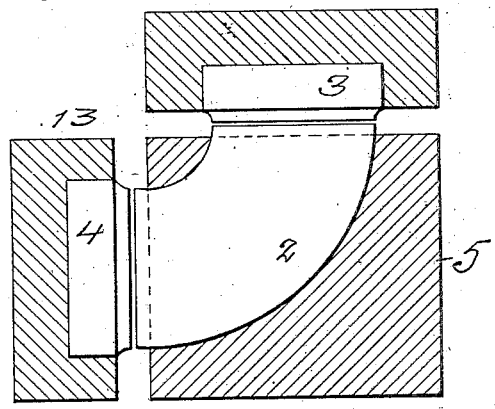
Figure 3:
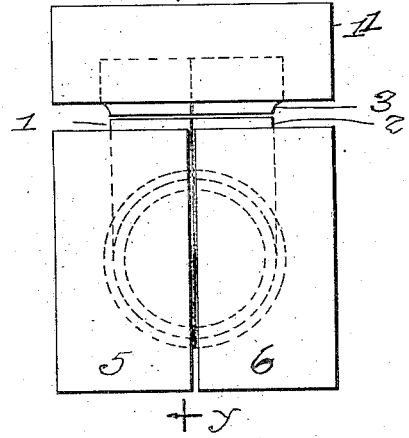
Figure 4:
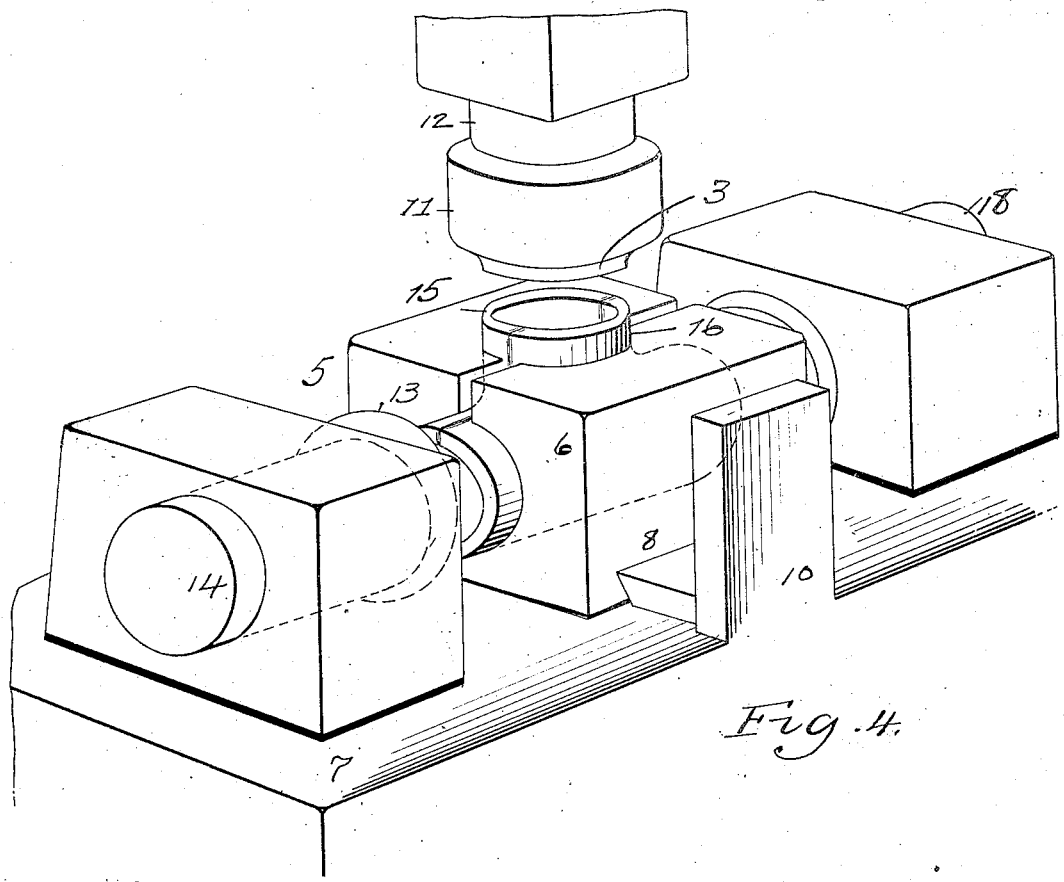
Figure 5:
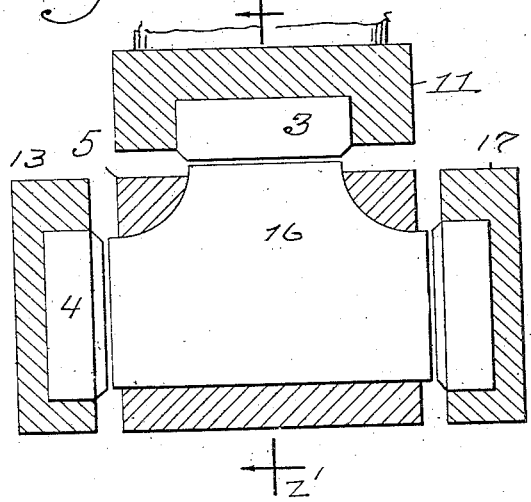
Figure 6:
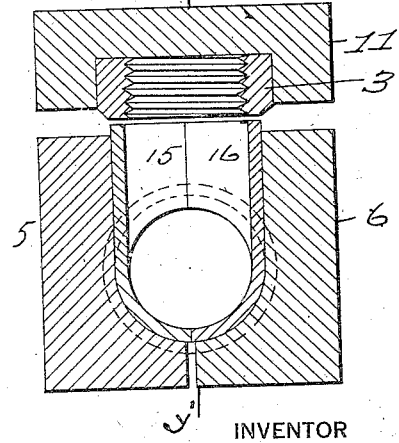

Fig. 1 is a perspective view of my apparatus for electrically welding the parts of an elbow coupling. Fig. 2 is a section on the line $y$, $y$ of Fig. 3, showing the parts of the coupling disposed in the welding electrodes. Fig. 3 is an end view of said electrodes, with the parts of the coupling in position therein. Fig. 4 is a perspective view of my apparatus arranged for electrically welding the parts of a T coupling. Fig. 5 is a section on the line $y'$, $y'$ of Fig. 6, showing the parts of the coupling disposed in the welding electrodes. Fig. 6 is a section on the line $z'$, $z'$ of Fig. 5.

Similar numbers and letters of reference indicate like parts.

I will first describe my apparatus as arranged for making an elbow pipe coupling, and as shown in Figs. 1 to 3, inclusive.

The body portion of the coupling is formed in two longitudinal half sections 1, 2, the said sections being preferably struck, pressed or stamped from sheet metal and welded at their meeting edges. To the ends of said sections are welded reinforcing rings 3, 4, which may be internally threaded. Said rings may be drop-forged or produced exactly alike in any suitable way and register with the ends of said body portion. In the opposing faces of said electrodes are matrices conforming to the shape of the half sections 1, 2, in which matrices said half sections are seated with their registering edges in contact, and with their ends protruding beyond said electrodes. One electrode, as 5, is fixed. The other electrode, 6, on its under side has a dovetail groove to receive the fixed guide 8. A screw 9 passing through standard 10 on table 7 may be used to cause electrode 6 to slide on guide 8, and so to be pressed toward electrode 5. When welding current is established between electrodes 5, 6, the said registering edges of sections 1, 2 are welded, completing the body portion of the coupling.

One of the rings, 3, is secured in any suitable holder 11 and attached to a vertically moving presser rod 12. The other ring 4 is secured in any suitable holder 13 and attached to a horizontally moving presser rod 14. These rings may be simultaneously or successively pressed into contact with the protruding ends of the body portion of the coupling and electrically welded to said ends.

In Fig. 1, I illustrate one way of arranging circuits for the welding operations above noted—it being understood that other ways may, of course, be adopted. When the switches A, B are moved to close circuit from transformer T to contacts $c$ and $d$, then the electrodes 5, 6 only are in circuit, and the half sections 1, 2 may be welded together. When switch A is on contact $e$ and switch B is on contact $d$, circuit is established between ring 3 and the coupling body, and when switch B is on contact $f$ and switch A on contact $c$, circuit is established between ring 4 and said coupling body.

The T-coupling shown in Figs. 4 to 6 inclusive is made in similar manner and by my apparatus arranged as in Fig. 4. The body portion of the coupling is formed in two longitudinal half sections 15, 16, to the three ends of which are welded reinforcing rings 3, 4, 17, preferably internally threaded. The welding apparatus is the same as in Fig. 1, with the difference that a third supporting presser rod 18 is added which carries the ring 17 and presses it against one of the ends of said body portion.

I claim:

1. An electrical welding apparatus for pipe couplings, comprising members having matrices in their opposing faces for receiving longitudinal half sections unitedly forming the body portion of said coupling, an end of said body portion protruding beyond said members, means for holding and pressing a reinforcing ring against said protruding end, and means for establishing welding current between said half sections and between said ring and said end of said body portion.

2. An electrical welding apparatus for pipe couplings, comprising members having matrices in their opposing faces for receiving longitudinal half sections unitedly forming the body portion of said coupling, the ends of said body portion protruding beyond said members, means for holding and pressing reinforcing rings against said protruding ends, and means for establishing welding current between said half sections and between said rings and the ends of said body portion.

In testimony whereof I have affixed my signature in presence of two witnesses.

THOMAS E. MURRAY.

Witnesses:
 GERTRUDE T. PORTER,
 MAY T. McGARRY.